US006841093B2

(12) United States Patent
Kim et al.

(10) Patent No.: US 6,841,093 B2
(45) Date of Patent: Jan. 11, 2005

(54) METHOD FOR MANUFACTURING SPHERICAL BLUE FLUORESCENT SUBSTANCE

(75) Inventors: Gyun-Joong Kim, Taejeon (KR); Min-Soo Kang, Taejeon (KR); Tae-Hyun Kwon, Taejeon (KR)

(73) Assignee: LG Chemical Ltd., Seoul (KR)

( * ) Notice: Subject to any disclaimer, the term of this patent is extended or adjusted under 35 U.S.C. 154(b) by 14 days.

(21) Appl. No.: 10/204,055

(22) PCT Filed: Dec. 16, 2000

(86) PCT No.: PCT/KR00/01476

§ 371 (c)(1),
(2), (4) Date: Aug. 16, 2002

(87) PCT Pub. No.: WO02/064701

PCT Pub. Date: Aug. 22, 2002

(65) Prior Publication Data

US 2003/0047713 A1 Mar. 13, 2003

(51) Int. Cl.[7] ............................................... C09K 11/00
(52) U.S. Cl. ............................... 252/301.4 R; 313/486; 313/582; 313/584
(58) Field of Search ................... 252/301.4 R; 313/486, 313/582, 584

(56) References Cited

U.S. PATENT DOCUMENTS

| 5,350,971 A | | 9/1994 | Jeong ......................... 313/487 |
| 5,611,959 A | * | 3/1997 | Kijima et al. ......... 252/301.4 R |
| 6,197,218 B1 | * | 3/2001 | Hampden-Smith et al. ...... 252/301.4 R |

FOREIGN PATENT DOCUMENTS

| JP | 52-144385 A | | 12/1977 |
| JP | 2-170888 A | | 7/1990 |
| JP | 9-157644 A | | 6/1997 |
| JP | 09-310067 | * | 12/1997 |

OTHER PUBLICATIONS

Translation for JP 09–157644.*

* cited by examiner

*Primary Examiner*—C. Melissa Koslow
(74) *Attorney, Agent, or Firm*—Birch, Stewart, Kolasch & Birch, LLP

(57) ABSTRACT

The present invention relates to a method for manufacturing spherical and highly crystalline BAM blue phosphor particles, that are close to a single crystal. According to the present invention, the spherical BAM blue particles that are preferable for embodying pictures on a very bright PDP screen can be obtained by mixing raw materials with fluxes to prepare a mixture, transferring the mixture into a closed reactor, and heat-treating the mixture under a reducing atmosphere containing nitrogen and hydrogen.

6 Claims, 7 Drawing Sheets

US 6,841,093 B2

METHOD FOR MANUFACTURING SPHERICAL BLUE FLUORESCENT SUBSTANCE

This application is the national phase under 35 U.S.C. § 371 of PCT International Application No. PCT/KR00/01476 which has an International filing date of Dec. 16, 2000, which designated the United States of America.

BACKGROUND OF THE INVENTION (a) Field of the Invention

The present invention relates to a method for manufacturing a spherical BAM blue phosphor ($BaMgAl_{10}O_{17}:Eu^{2+}$), and more particularly, to a method for manufacturing a spherical BAM blue phosphor particle that is preferable for embodying pictures having a high brightness. This is obtained by mixing raw materials with a melting agent (flux), followed by introducing the mixture into a closed reactor and heat-treating the mixture under a reducing atmosphere composed of nitrogen and hydrogen.

(b) Description of the Related Art

One of the major applications of phosphor is the field of display, in which the three primary visible colors, that is, red, green, and blue, are used to accomplish full color pictures. The three primary colors are generated when fluorescent materials (phosphors) are excited by external energies, such as through accelerated electron irradiation, ultraviolet radiation, an electron field, heat, etc. In general, phosphor is preferable for color display applications, as it has the unique property of high luminescence and high color purity of luminescence comprising the three primary colors. Phosphors are further desirable for this application as they have the property of high stability that can show little changes in optical properties during the heat-treatment and the chemical-treatment processes applied to parts of the display.

A commonly used method for coating phosphor particles onto the plasma display panel is the screen-printing method, in which the formulated phosphor paste is printed, forming thin phosphor layers within the discharge cells. In this process, highly packed phosphor layers are preferable for embodying pictures having high brightness. The shapes of coated phosphor layers are very much influenced by the shape of individual phosphor particles, the paste formulation, and coating process conditions. It is well known that spherically-shaped phosphor particles yield higher packing efficiency compared to non-spherical ones. Therefore, it is commercially viable for a company to be in the business of supplying phosphors that are spherically shaped.

Phosphors are ceramics generally manufactured by heating mixed raw materials at 600 to 1500° C. in order to complete solid state chemical reactions in either a batch-type or a continuous-type electric furnace under a controlled atmosphere. The melting agents (fluxes) are usually added to the mixed raw materials in order to facilitate the solid-state chemical reaction. The sizes and shapes of the resulting phosphors after high temperature reaction depend on both the heating schedules and the melting agents, that is, the flux systems, such as the types of flux materials and the amounts of flux.

The presently marketed BAM ($BaMgAl_{10}O_{17}:Eu^{2+}$) is a blue phosphor wherein the mean particle diameter is from 2 to 10 micrometers, and the crystallinity of each particle is close to a single crystal. Recently, a demand for phosphors having well-controlled characteristics such as small and round particles has increased due to their superior performance in high resolution PDP applications.

Many efforts to manufacture round and small BAM blue phosphor particles have been made thus far, for example, sol-gel, hydrothermal, combustion, and coprecipitation methods.

The currently commercially available BAM blue phosphors for PDP applications, however, do not have the above-mentioned desirable particle characteristics. They are mostly either irregularly shaped or plate shaped. Although one of them shows a round morphology, its individual phosphor grain consists of several thin platy particles.

A manufacturing process of BAM blue phosphors patented by Matsushita is not preferable for obtaining BAM having the above-mentioned desirable particle characteristics due to the platy morphology of the products, because, even though they use spherically-shaped alumina as an alumina source material, they don't use any flux agents.

There is also a report for manufacturing BAM blue phosphor using pyrolysis methods. However, the methods results in platy phosphor particles instead of round-shaped ones.

SUMMARY OF THE INVENTION

To resolve the above problems, it is an object of the present invention to provide a method for manufacturing BAM blue phosphors for a PDP wherein each particle is spherical-shaped, highly crystalline, and the particle diameter is less than 5 micrometers, thereby providing a highly packed phosphor layer formation in the PDP cell, which is preferable for embodying pictures having high brightness.

It is another object to provide BAM blue phosphors for a PDP wherein each particle is spherical-shaped, highly crystalline and close to a single crystal, and the particle diameter is less than 5 micrometers, manufactured by the above-described method.

In order to achieve these objects and others, the present invention provides a method for manufacturing a highly crystalline spherical blue phosphor, comprising the steps of mixing fluorescent raw materials selected from the group consisting of $Al_2O_3$ or $Al(OH)_3$, $BaCO_3$, $MgO$, and $Eu_2O_3$ with fluxes; introducing the mixture into a closed reactor; and heat-treating the mixture under a controlled atmosphere comprised of nitrogen and hydrogen.

The present invention also provides highly crystalline, spherical blue phosphors that are close to a single crystal, and manufactured by the above-described method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
FIG. 1 is a SEM picture (magnification: 5,000) of BAM blue phosphors manufactured according to embodiments of Example 1.

For a better understanding of the present invention, reference will now be made in detail to the following disclosures.

In order to manufacture a spherical BAM blue phosphor particle, the inventor carried out several experiments using various methods. These methods included the use of fluoro compounds as shape-controlling melting agents (fluxes), mixing raw materials with flux to prepare a mixture, introducing the mixture into a closed reactor, and heat-treating it under a reducing atmosphere containing nitrogen and hydrogen.

In the present invention, the raw materials are selected from the group consisting of $Al_2O_3$, $Al(OH)_3$, $BaCO_3$, $MgO$, and $EU_2O_3$. Preferably, the relative content of the ingredients $Al_2O_3$ or $Al(OH)_3$:$BaCO_3$:$MgO$:$Eu_2O_3$ is 2:0.34 or 0.38:0.4:0.02 or 0.06, in moles. The relative mole ratio of $BaCO_3$ and $Eu_2O_3$ is 0.4. More preferably, the relative mixing ratio of $Al_2O_3$ or $Al(OH)_3$:$BaCO_3$:$MgO$:$Eu_2O_3$ is 2:0.36:0.4:0.04. $Al(OH)_3$ is further preferable to $Al_2O_3$.

The fluxes used in the present invention are preferably fluoro compounds. Preferably, the fluoro compounds are selected from the group consisting of $Al_2O_3$, $Al(OH)_3$, $BaCO_3$, $MgO$, $Eu_2O_3$, and mixtures thereof, that is, $AlF_3$, $BaF_2$, $MgF_2$, $EuF_3$ and mixtures thereof. Also in the present invention, it is desirable that the amount of fluxes used is controlled in order to procure proper phosphor grain sizes. Phosphors having an average particle size ranging from 2 $\mu$m to 5 $\mu$m are desirable for PDP applications. Therefore, the preferred amount of fluxes ranges from 0.1 wt % to 10.0 wt % based on the total amount of the mixed raw materials, including fluxes. If the amount of the said fluxes is less than 0.1 wt %, the size of the resulting phosphor particles is too small, whereas if the amount of fluxes is above 10.0 wt %, the size of the resulting phosphor particles is too large to be applied to a PDP.

The method for mixing the raw materials with the fluxes is generally a ball milling method, however it is not limited to this, and other mixing methods including hand mixing or any dry mixing can be applicable as long as the method results in a homogeneous mixing of raw materials.

In addition, the fluxes can be mixed with raw materials in solvent mediums. The highly volatile alcohols are preferred for solvent mediums, and ethanol is more preferable. If a solvent is used for mixing purposes, it is desirable that after the mixing step the solvent is completely removed before the heat-treating step.

The present invention includes transferring the mixture of raw materials including fluxes into a closed reactor and heat-treating it under a controlled atmosphere comprising nitrogen and hydrogen.

An alumina crucible is preferred as a reactor. The reactor must be closed during the heat-treating step to keep the fluxes within the reactor, otherwise the morphology of the resulting phosphor particles becomes platy rather than spherical.

The heat-treating process in the present invention should be undertaken under a reducing atmosphere comprised of nitrogen and hydrogen, wherein $Eu^{3+}$ is reduced to $Eu^{2+}$. The preferred mixing ratio of nitrogen to hydrogen ranges from 85:15 to 98:2 wt %. If the hydrogen content is less than 2%, the extent of the reduction reaction is too low, whereas if it is above 15%, problems arise as to the safety of the process gases. More preferably, the mixing ratio of the said gases is 96:4.

In the heat-treating process of the present invention, the temperature of the heat-treatment ranges from 1,100 to 1,700° C. When the heat-treating temperature is below 1,100° C., the required complete solid-state reaction does not take place, or the resulting particle size of the phosphor is too small; whereas when the reaction temperature is above 1,700° C., in spite of the completeness of the reaction, the resulting particle size of the phosphor is too large to be applicable in PDPs. The most preferable temperature of the heat-treating process ranges from 1,300 to 1,500° C.

The present invention provides a method by which highly crystalline, spherical BAM blue phosphor particles that are close to a single crystal can be manufactured, wherein the morphology of the product is spherical and the average particle size ranges from 3.5 to 4 $\mu$m. The spherical BAM blue phosphor particles of the present invention are suitable not only for PDPs that can embody pictures having high brightness, but also for fluorescent lamps.

The present invention is explained in more detail with reference to the following examples. However, the present invention is not limited to the following examples.

EXAMPLE 1

A 99.7 wt % raw material mixture comprising 2 moles of $Al_2O_3$, 0.36 mole of $BaCO_3$, 0.4 mole of $MgO$, 0.04 mole of $Eu_2O_3$, and 0.3 wt % of $AlF_3$ as a flux were well-mixed by ball milling at 250 rpm for 20 hours in ethanol. After the complete removal of ethanol, the dried mixture was transferred to a 300 cc alumina crucible, covered well, and heat-treated at 1500° C. for 4 hours under a controlled atmosphere comprised of 96 vol % of $N_2$ and 4 vol % of $H_2$. As shown in FIG. 1, it is evident that the morphology of the resulting phosphor grain was spherical.

EXAMPLE 2

Figure 2:
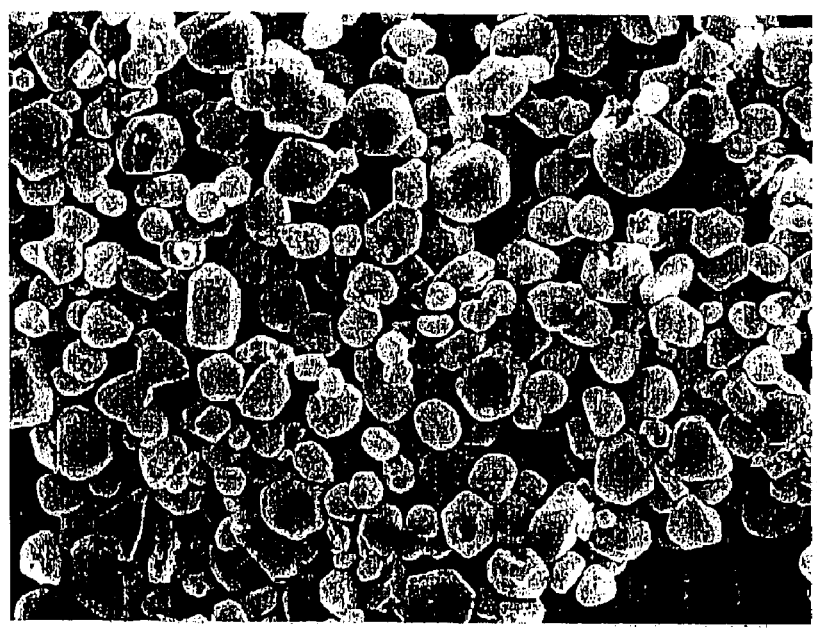
FIG. 2 is a SEM picture (magnification: 3,000) of BAM blue phosphors manufactured according to embodiments of Example 2.
Figure 3:
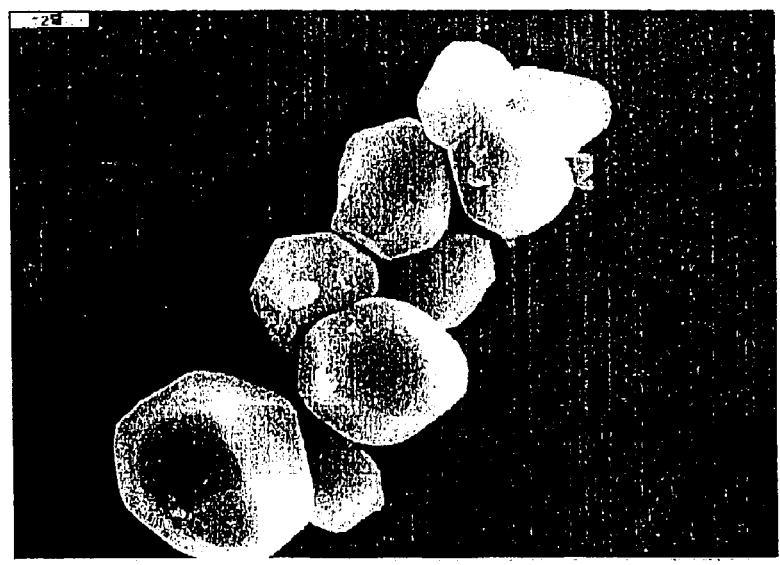
FIG. 3 is a SEM picture (magnification: 7,000) of BAM blue phosphors manufactured according to embodiments of Example 2.

A mixture of 99.7 wt % of raw materials containing 4 moles of $Al_2O_3$, 0.36 mole of $BaCO_3$, 0.4 mole of $MgO$, 0.04 mole of $Eu_2O_3$, and 0.3 wt % of $AlF_3$ as a flux, were mixed well by ball milling at 250 rpm for 20 hours in ethanol. After evaporating out the ethanol, the mixture was transferred to a 300 cc alumina crucible, covered tightly, and heat-treated at 1500° C. for 4 hours under a controlled atmosphere comprised of 96 vol % of $N_2$ and 4 vol % of $H_2$. FIG. 2 (magnification: 3,000) and FIG. 3 (magnification: 7,000) show the shapes of the resulting phosphor grains. In FIG. 2 and FIG. 3, it is noted that each phosphor grain was spherical in shape and uniform.

Figure 4:
FIG. 4 is a SEM picture (magnification: 5,000) of BAM blue phosphors manufactured according to embodiments of Reference Example 1.

A mixture of 99.9 wt % of raw materials containing 2 moles of $Al_2O_3$, 0.36 mole of $BaCO_3$, 0.4 mole of $MgO$, 0.04 mole of $Eu_2O_3$, and 0.1 wt % of $AlF_3$ as a flux, were mixed by ball milling at 250 rpm for 20 hours in ethanol. After the removal of the ethanol, the resulting dried mixture was transferred to a 300 cc alumina crucible, opened, and heat-treated at 1500° C. for 4 hours under a reducing atmosphere comprised of 96 vol % of $N_2$ and 4 vol % of $H_2$. As in FIG. 4, it is evident that the shape of the phosphor grain was not spherical, but elongated.

Figure 5:
FIG. 5 is a SEM picture (magnification: 5,000) of BAM blue phosphors manufactured according to embodiments of Reference Example 2.
Figure 6:
FIG. 6 is a SEM picture (magnification: 7,000) of commercially available BAM blue phosphors.

For the manufactured mixture, 99.7 wt % of raw material comprising 4 moles of $Al_2O_3$, 0.36 mole of $BaCO_3$, 0.4 mole of MgO, 0.04 mole of $Eu_2O_3$, and 0.3 wt % of $AlF_3$ as a flux, were mixed by ball milling at 250 rpm for 20 hours in ethanol. After the removal of the ethanol by evaporation, the mixture was transferred to a 300 cc alumina crucible, opened, and heat-treated at 1500° C. for 4 hours under a reducing atmosphere comprised of 96 vol % of $N_2$ and 4 vol % of $H_2$. As shown in FIG. 5, the morphology of most of the resulting or grains was not spherical.

EXPERIMENT 1

Figure 7:
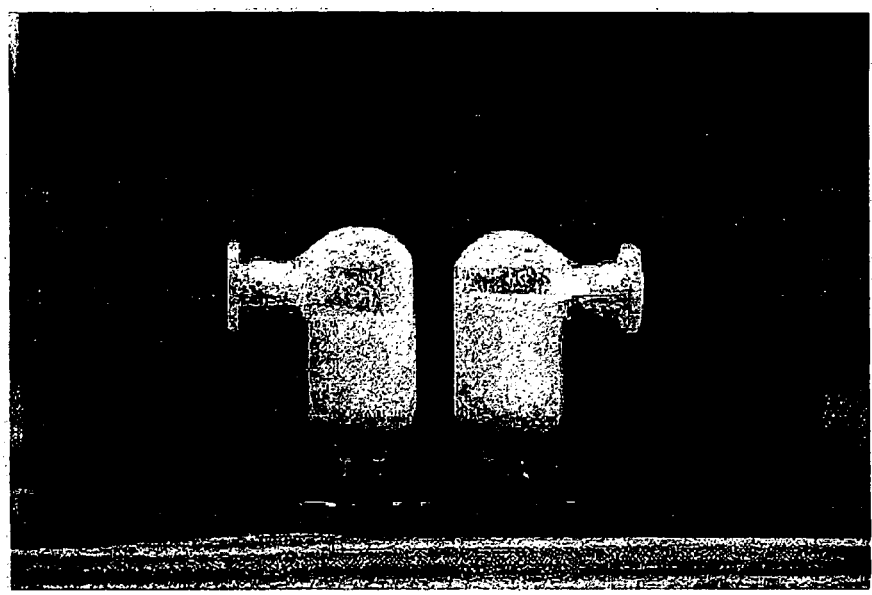
FIG. 7 is a picture which shows the difference in volumes occupied by the phosphor powder of Example 2 and the commercially available one in equal weight.

Comparative Experiment in Relation to the Packing Efficiency of the Phosphor Grain The experiment was carried out by comparing the packing efficiency of the spherical phosphor grain obtained according to Example 2 with that of the commercially available platy phosphor grain using a measuring instrument. As shown in FIG. 7, it is evident that the packing efficiency of the spherical phosphor grains was higher than that of the commercially available platy phosphor grains by 17%. We can infer from this observation that the phosphor layers formed by the spherical grains on the PDP cell are more efficiently packed than those formed by non-spherical grains, therefore a very bright PDP screen can be manufactured by using spherical phosphor grains.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing spherical BAM ($BaMgAl_{10}O_{17}$:$Eu^{2+}$) blue phosphors, comprising:

a) mixing raw materials selected from the group consisting of $Al_2O_3$, $Al(OH)_3$, $BaCO_3$, MgO, and $Eu_2O_3$ with fluxes to prepare a mixture, and b) transferring the resulting mixture into a closed reactor and heat-treating the mixture under a reduced atmosphere of a mixed gas composed of nitrogen and hydrogen, wherein the fluxes include fluoro compounds.

2. The method of claim 1 wherein the fluxes are selected from the group consisting of $AlF_3$, $MgF_2$, $BaF_2$, and a mixture thereof.

3. The method of claim 1 wherein the amount of flux ranges from 0.1 to 10.0 wt % in the mixture.

4. The method of claim 1 wherein the heat-treating temperature ranges from 1,100 to 1,700° C.

5. The method of claim 1 wherein the mixed gas composed of nitrogen and hydrogen has a 96:4 mixed volume ratio.

6. A PDP (plasma display panel) or a fluorescent lamp containing the spherical BAM blue phosphors of claim 1.

* * * * *